United States Patent [19]

Bi et al.

[11] Patent Number: 5,151,911
[45] Date of Patent: Sep. 29, 1992

[54] PROCESS FOR REDUCING HIGH-FREQUENCY ENERGY NOISE COMPONENTS IN THE OUTPUT RADIATION OF A LASER, PROCESS FOR GENERATING SHORT LASER PULSES, AND LASERS UTILIZED FOR THIS PURPOSE

[75] Inventors: Junging Bi, Worblaufen; Paul A. Beaud, Bern; Jürg A. Schütz, Jegenstorf; Walter Hodel, Bern; Heinz P. Weber, Breitägertenstrasse 2, 3122 Kehrsatz, all of Switzerland

[73] Assignee: Heinz P. Weber, Kehrsatz, Switzerland

[21] Appl. No.: 689,487

[22] Filed: Apr. 23, 1991

[30] Foreign Application Priority Data

May 11, 1990 [CH] Switzerland .................. 1610/90

[51] Int. Cl.⁵ ................................................ H01S 3/10
[52] U.S. Cl. ........................................ 372/32; 372/25; 372/29; 372/30
[58] Field of Search ............... 372/29, 30, 92, 99, 372/25, 97, 33, 32

[56]  References Cited

U.S. PATENT DOCUMENTS 4,864,577  9/1989  Aoshima et al. .................... 372/25

OTHER PUBLICATIONS

P. N. Kean, et al, "Enhanced Mode Locking of Color-Center Lasers", Optics Letters, vol. 14, No. 1, Jan. 1, 1989.

Primary Examiner—James W. Davie
Attorney, Agent, or Firm—Brady, O'Boyle & Gates

[57]  ABSTRACT

A laser output radiation with reduced energy noise components is produced which is also usable for the formation of short, stable laser pulses in the pico- and sub-picosecond ranges. The low noise components are obtained by superposition of the resonator wave in the active medium with its fed back output radiation lying on the order of magnitude of the spontaneous radiation emission of the oscillating resonator wave.

19 Claims, 2 Drawing Sheets

PROCESS FOR REDUCING HIGH-FREQUENCY ENERGY NOISE COMPONENTS IN THE OUTPUT RADIATION OF A LASER, PROCESS FOR GENERATING SHORT LASER PULSES, AND LASERS UTILIZED FOR THIS PURPOSE

BACKGROUND OF THE INVENTION

The disclosed invention relates to a process for reducing high-frequency energy noise components in the output radiation of a laser, to a process for generating short pulses, and to lasers utilized for short pulses in a particularly simple, rugged, and compact structure.

High-frequency energy noise components of a laser output radiation are understood to mean energy noise components in the frequency range of 100 kHz to several GHz, preferably of 100 kHz to 4 MHz.

The process of this invention and the laser in accordance with this invention result, in a continuous laser, in a reduction of the high-frequency energy noise components in the output radiation and, in case of a pulsed laser, due to the reduction of the noise components, in a stabilization of the peak intensity and the pulse duration of the laser pulses.

The spontaneous radiation emission of a laser is understood to mean a radiation of the same radiation frequency as the laser output radiation which, in case of a laser that is pumped, but not oscillating, extends in the direction in the laser cavity wherein also the laser output radiation would extend in case of an oscillating laser. A pumped laser can be prevented from oscillating, for example, by tilting its resonator mirrors.

Mode-coupled lasers are understood to mean lasers for the generation of pulses in the pico- and sub-picosecond ranges wherein an active or passive loss, amplification or phase modulation is performed in the laser cavity.

A process for generating short laser pulses with the use of a feedback path containing optically nonlinear components has been known from the publication by P. N. Kean et al., "Enhanced Mode Locking of Color-Center Lasers", Opt. Lett. vol. 14, No. 1, Jan. 1, 1989, pp. 39–41. In the conventional method, a color-center laser with a KCl:Tl color-center crystal is continuously pumped with a mode-locked Nd:YAG laser. The reflection of the coupling-out mirror of the laser cavity amounts to 80%. A portion of the laser output power is coupled into a germanium-containing, single-mode waveguide having a length of 2.2 m by means of a beam splitter outside of the cavity on the side of the coupling-out mirror. A mirror is mounted at the end of the waveguide; this mirror reflects the light exiting from the waveguide back into the latter. The distance between the end of the waveguide and the waveguide mirror is adjustable by means of a piezoelectric shifting device (PZT). The energy coupled into the waveguide can be attenuated by means of a neutral density filter (ND). The laser radiation coupled into the waveguide by the beam splitter passes through the waveguide, is reflected on the waveguide mirror, passes a second time through the waveguide, and is again coupled into the laser cavity via the beam splitter and the coupling-out mirror. On the basis of optical nonlinearities in the waveguide, caused by the Kerr effect induced by the laser pulse, a frequency expansion of the pulse propagated in the waveguide takes place. The setting of an optimum phase relationship between the laser radiation in the laser cavity and the radiation fed back via the waveguide is effected by means of an electronic evaluating circuit which moves the waveguide mirror by way of the shifting device into the optimum distance with respect to the waveguide end. By the superposition of the laser pulses oscillating in the laser cavity with the pulses frequency-expanded by the waveguide, laser pulses are produced in the laser cavity having pulse widths in the pico- and sub-picosecond ranges. If additionally the energy coupled into the waveguide is optimized by means of the neutral density filter, extremely short laser pulses are obtained on the order of magnitude of 1.1 ps (picoseconds = $10^{-12}$ seconds). With a shortening of the waveguide to a length of 24 cm, laser pulses were obtained having a pulse width of 260 fs (femtoseconds = $10^{-15}$ seconds).

SUMMARY OF THE INVENTION

Examples of the laser according to this invention and of the process of this invention for generating a laser output radiation with small components of high-frequency energy noise, as well as, in particular, for the generation of short, stable laser pulses due to the reduction in energy noise components, will be described in greater detail below with reference to the drawings. The resonator mirrors in a resonator cavity form a first radiation feedback inside the resonator cavity. An optical secondary feedback device of simple construction, either outside or inside the laser cavity, forms from a portion of the intensity of the output laser radiation a fractional second radiation feedback having a valve of between $10^{-6}$ and $10^{-10}$ of the laser radiation inside the resonator, which lies in the range of magnitude of 0.5 to 50,000 times the intensity of the spontaneous radiation emission of the radiation cavity, and feeds it back in superposition on the resonator wave of the cavity. These feedback superimposed extremely low pulse intensities drastically reduce the high-frequency energy noise components of the generated laser pulses from the radiation cavity.

DESCRIPTION OF THE PREFERRED EMBODIMENTS

Figure 1:
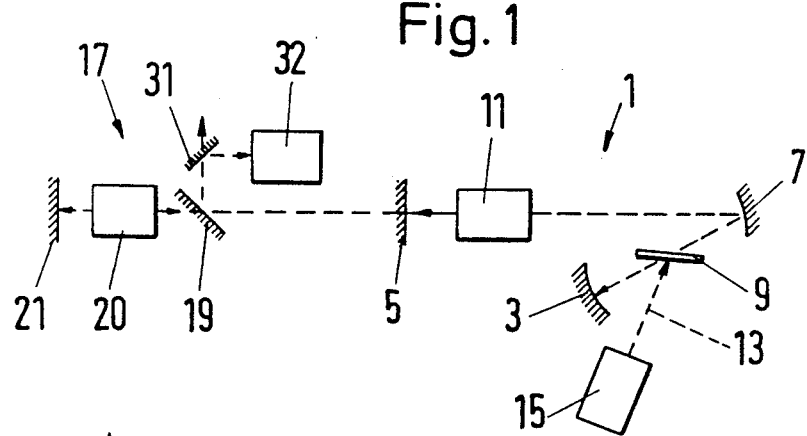
FIG. 1 is a schematic view of a dye laser for the generation of short pulses with a secondary feedback device.

The dye laser for the generation of short pulses, illustrated in FIG. 1, has a laser cavity 1 with the two resonator mirrors 3 and 5 and a passive reflector 7 having a degree of reflection of approximately 100%, which reflector is unimportant for the mode of operation. One of the resonator mirrors 3 has a degree of reflection of approximately 100%, and the other resonator mirror 5, acting as a coupling-out mirror, has a degree of reflection of 87%. The two resonator mirrors 3 and 5 are arranged at a spacing of 1.83 m. A dye stream 9 (so-called jet) is located within the laser cavity 1, along with an etalon 11 as the frequency-determining element. By means of the etalon 11, the laser cavity 1 can be tuned for producing radiation having a wavelength of between 1.25 and 1.35 $\mu$m; the etalon is adjusted, for the process described below, so that laser pulses are generated having a wavelength of 1.3 $\mu$m. The dye of the jet 9 is an infrared dye stuff $C_{44}H_{30}S_2ClF_7O_2$, known under the name of No. 26+HFB− and obtainable, for example, from the company Lambda Physics. The infrared dye is dissolved in α-hydroxytoluene, a benzyl alcohol, available, for example, under the name of "golden label" from the company Aldrich.

Figure 2:
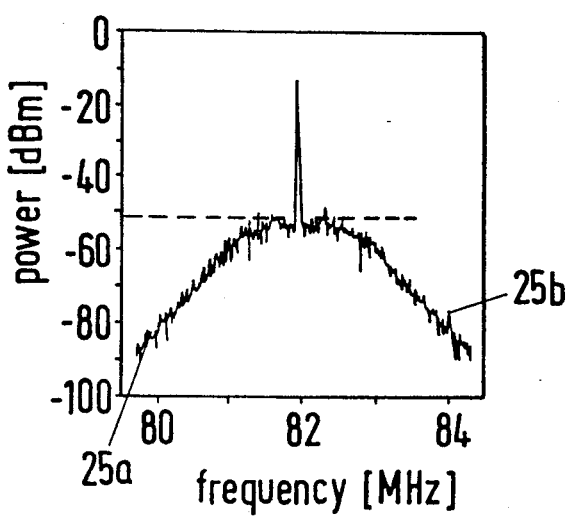
FIG. 2 shows high-frequency energy noise components (in English: power spectrum) of laser pulses of the dye laser without secondary feedback device, pumped with laser pulses having a width of 4 ps of a Nd:YAG laser with a repetition frequency of 82 MHz, in synchronous fashion.

As the pumping pulses 13, laser pulses from a Nd:YAG laser 15 are radiated into the jet 9 with a pulse width of 4 ps and a repetition frequency of 82 MHz in tuning with the cavity length of 1.83 m. This type of laser excitation is called synchronous pumping. The generation of such Nd:YAG laser pulses has been described, for example, in the publication by B. Zysset et al., "200-Femtosecond Pulses at 1.06 $\mu$m Generated with a Double-Stage Pulse Compressor", Opt. Lett., vol. 11, March 1986, pp. 156-158. The lifetime of the upper excited laser level of the dye ranges at about 11 ps. The laser pulses, produced with the dye laser without the subsequently described secondary feedback device 17, have a pulse width of 300 fs, pendulating back and forth along the optical primary path between the cavity mirrors 3 and 5 with 82 MHz. The high-frequency energy noise spectrum of these laser pulses is illustrated in FIG. 2 in the range of eighty to eighty-four megahertz. The energy noise components surrounding the frequency of eighty-two megahertz are located in an approximately bell-shaped curve around the base point of the 82 MHz value with a maximum noise level of about 52 dBm.

Outside of the laser cavity 1 on the side of the coupling-out mirror 5, an arrangement is located denoted as the secondary feedback device 17, with optically linearly acting components; this device feeds back a fraction of the intensity of the laser pulses generated in the laser cavity 1 into the mode volume of the cavity 1. The arrangement was denoted as the secondary feedback device 17 in order to provide a distinction with respect to a primary feedback device of the thus-produced laser pulses through the two resonator mirrors 3 and 5. The secondary feedback device 17 shown in FIG. 1 has a beam splitter 19, an adjustable attenuator 20, and a mirror 21.

The beam splitter 19 deflects approximately 100% of the intensity of the laser pulses penetrating the resonator mirror 5, and permits only a portion of $10^{-2}$ of the intensity of the laser pulses to pass through. The attenuator 20 is designed so that it is capable, in an adjustable fashion, to attenuate the pulses passing therethrough by a factor of between undamped and $10^{-2}$. The mirror 21 is designed so that is reflects a portion of $10^{-2}$ of the impinging intensity back again into the beam. This mirror can be shifted by several millimeters in its position in the axis of the laser beam. The coupling-out mirror 5, the beam splitter 19, the attenuator 20, and the mirror 21 are arranged so that the attenuated laser pulses, impinging on the mirror 21, are guided again into the mode volume in the jet 9 of the cavity wave oscillating in the laser cavity 1 (laser pulses). The optical primary path between the resonator mirrors 3 and 5 and the optical secondary path between the coupling-out mirror 5 and the mirror 21 are chosen to be almost equally long, i.e., the intensity component of a laser pulse reflected back by the mirror 21 into the laser cavity 1 is always superimposed on the respectively subsequent laser pulse in the jet 9. The exact position of the mirror 21, as already mentioned above and as will be described in greater detail below, is displaceable by several millimeters in the direction of the laser beam in order to optimize the laser pulses. The adjusting mechanism and a control means which maintains the once set optical distance of the mirror 21 on the order of magnitude of the optical wavelength are not described in any further detail.

The portion of the radiation of the laser pulses returned by the mirror 21 into the laser cavity 1 is attenuated, depending on the setting of the attenuator 20, by a factor of between $10^{-6}$ and $10^{-10}$, i.e. intensities are fed back into the laser cavity 1 which lie in the range of magnitude of 0.5 to 50,000 times the intensity of the spontaneous emission of radiation of the cavity wave; in the extreme case, only a small number of photons is returned.

Figure 3:
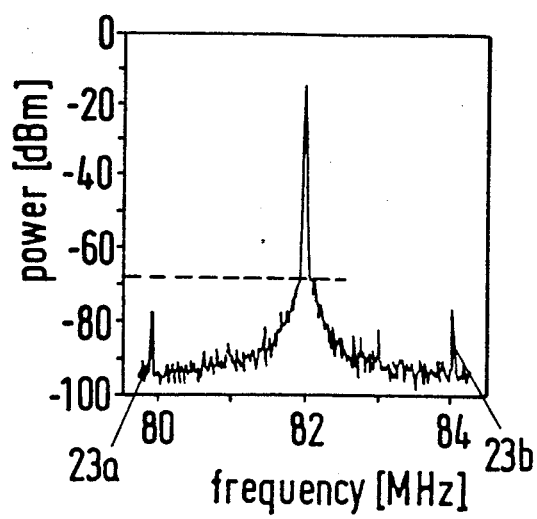
FIG. 3 shows high-frequency energy noise components, reduced with respect to FIG. 2, of laser pulses of the dye laser, evoked by the secondary feedback device of this invention.

By feeding back these extremely low pulse intensities into the mode volume of the laser pulses in the jet 9, chronologically adapted to the oscillating laser pulses, the high-frequency energy noise components of the generated laser pulses are drastically reduced in contrast to the high-frequency energy noise spectrum illustrated in FIG. 2. The energy noise spectrum of laser pulses having a fed back intensity of $10^{-8}$ is shown in FIG. 3. In contradistinction to the bell-shaped noise curve, the noise curve here can be seen to be exponential, terminating into the 82 MHz peak. The maximum noise level lies at 67 dBm and is lower by 15 dBm, i.e. thus significantly lower, than the level shown in FIG. 2. In a comparison of FIGS. 2 and 3, it should be noted that the values of the frequency level on the ordinate are indicated on a logarithmic scale, namely in decibels [dBm]. The peaks 23a and 23b of the frequency level values at about 80 MHz and 84 MHz are based on special circumstances of the test arrangement which are not disclosed in further detail herein. The peaks 23a and 23b are present, due to the high noise level, as peaks 25a and 25b, barely recognizable, in FIG. 2.

Figure 4:
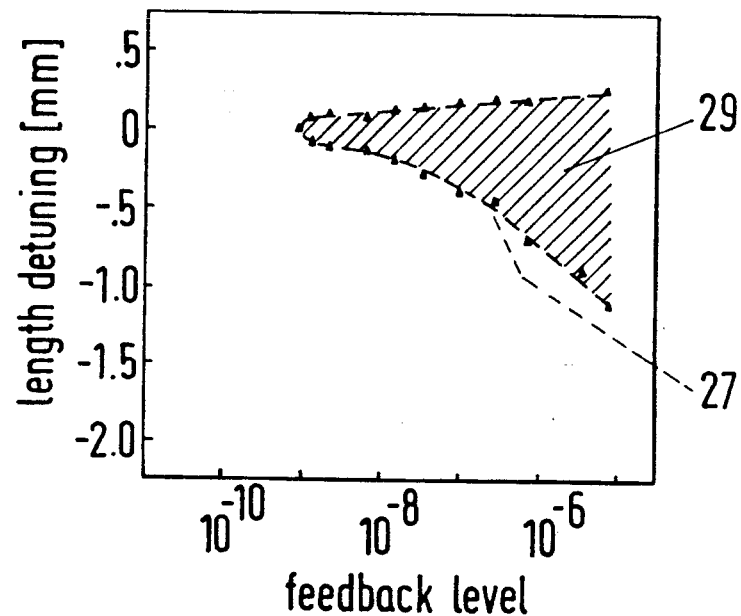
FIG. 4 is a diagram showing the dependence of the change in length of an optical secondary route of the secondary feedback device with respect to an attenuation factor of the laser pulses attenuated along the secondary route.

The length of the optical secondary path of the secondary feedback device 17 must be accurately set, and the once set value must be maintained at a stable level, even to fractions of the laser wavelength, during operation. The dependency of the adjustment of mirror 21 to bring about the change in length of the secondary path with respect to the fed back intensity is shown in FIG. 4; the abscissa shows the attenuation factor of the intensity of the pulses passing along the secondary path. The ordinate shows the shift of the mirror 21 in the beam direction, the positive and, respectively, negative values meaning that the mirror 21 has been moved away from the coupling-out mirror 5 and, respectively, toward this latter mirror. The dashed-line curve 27 encompasses a shaded region 29 wherein all measured values are located at which the energy fluctuation of the individual laser pulses outside of the laser cavity 1 is smaller than 0.5%, measured at the site 31 with an energy meter 32. These small energy fluctuations of 0.5% can be maintained at a feedback of between $10^{-6}$ and $10^{-10}$ of the intensity of the laser pulses and a shift of the mirror 21 of less than $\pm 0.5$ mm. The lengthening of the optical secondary path is equal to double the value of the shift of mirror 21.

Instead of designing the secondary feedback device 17 as described above, it can be constructed as a compact unit 33 comprising a coupling-out mirror 35 analogous to the coupling-out mirror 5 of the laser cavity 1, a mirror 36 analogous to the mirror 21 for the secondary path, and a beam splitter 41 analogous to the beam splitter 19. As will be explained below, an attenuator analogous to attenuator 20 is omitted.

Figure 5:
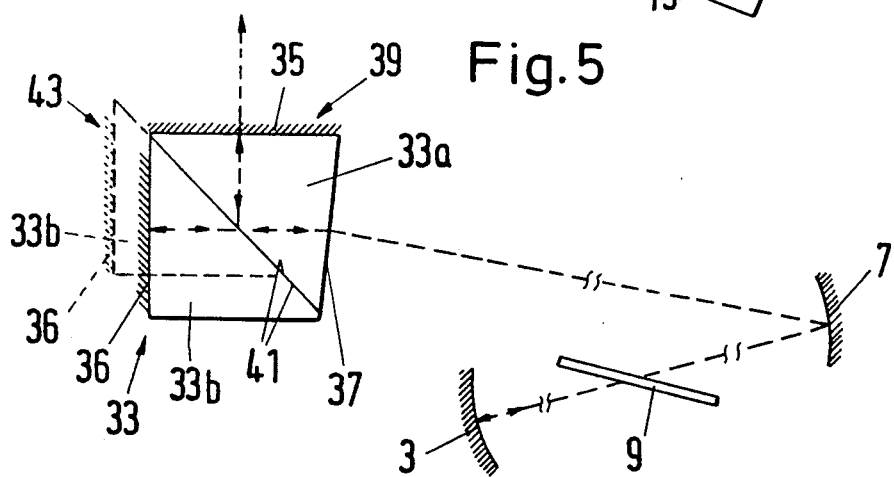
FIG. 5 shows a variation of the secondary feedback device.

The unit 33 is fashioned as a split cube 33 made up of an optically linearly acting material, with a reflection-reducing pulse inlet surface 37 inclined with respect to the laser beam axis; this surface does not transmit any laser radiation back into the laser cavity 1. The unit 33 is shown in FIG. 5. The cube face 43 lying in opposition to the inclined pulse inlet surface 37 is made reflective with its mirror surface 36 (i.e. coated) in such a way that it reflects back into itself $10^{-2}$ of the intensity impinging thereon, stemming from the laser pulses deflected via the separating surfaces 41 acting as beam splitters. The degree of reflection of the separating surfaces 41 of the two cube halves 33a and 33b is chosen so that approximately the entire intensity is reflect onto the cube face 39 lying perpendicularly to the cube face 43, and only $10^{-3}$ is permitted to pass through the cube face 43. The cube face 39 with the reflective coating 35 is coated analogously to the coupling-out mirror 5 and serves likewise as a coupling-out mirror for the laser cavity; in this case, analogously to the above-described example, 87% of the laser pulse intensity is reflected back into the laser cavity 1 (primary path), and the remaining 13% exits almost entirely from the laser cavity 1 as output pulses. The degree of reflection of the mirror 36 on the cube face 43 is selected, together with the transmission of the separating surface 41, so that a weakening of the intensity is obtained of $10^{-8}$. The reflected back intensity cooperates in the mode volume of the laser radiation in the jet 9 with the original radiation whereby, in turn, laser pulses are generated having the above-described low noise level. As contrasted to the first-described above arrangement, the secondary feedback device here is located directly within the laser cavity, and the fed back laser pulses cooperate directly with the pulse which generated them. Here again, the intensity fed back along the secondary path lies on the order of the spontaneous emission of the resonator wave.

The length of the secondary path is no longer determinable with reference to the coupling-out mirror 35 but rather with reference to the laser mirror 3; however, the primary and secondary paths are most extensively congruent already after the separating surfaces 41. The adjustment of the length of the secondary path takes place by shifting the cube half 33b, carrying the mirror 36, and its separating surface 41 along the separating surface 41 of the cube half 33a carrying the coupling-out mirror 35.

Instead of designing the mirror 36 with an extremely low degree of reflection, the cube half 43 can also be fashioned to be diffusely reflective.

Figure 6:
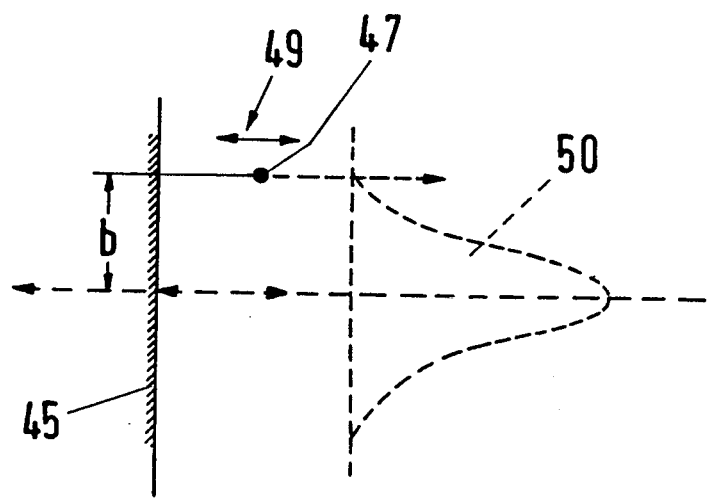
FIG. 6 shows another variation of the secondary feedback device.

Instead of constructing the unit 33 as a divided cube with the cube halves 33a and 33b, it is also possible, as illustrated in FIG. 6, to redesign the coupling-out mirror 5 so that it is a coupling-out mirror 45 with a curvature and degree of reflection both of which are analogous to the coupling-out mirror 35 or 5. In front of the coupling-out mirror 45, a reflecting wire 47 is arranged, extending in parallel to the coupling-out mirror surface and displaceable in parallel to the laser beam direction in the laser cavity 49 which latter is otherwise of a structure analogous to the laser cavity 1. The wire 47 is strung at a distance b from the center of the laser pulses impinging on the coupling-out mirror 45; the local intensity distribution 50 of these laser pulses is indicated in dashed lines in FIG. 6. The spacing b is chosen so that the wire 47 is contacted only by the outermost flanks of the local intensity distribution of the laser pulses. The intensity of the laser pulses reflected by the wire surface into the mode volume in the jet 9 is dimensioned so that it is on the order of magnitude of the spontaneous radiation emission of the cavity wave.

Instead of combining the secondary feedback device with the coupling-out mirror 5, 35 or 45, the device can also be combined with the approximately 100% mirror 3.

The advantage of the secondary feedback device consisting of the cube 33 and, respectively, of the mirror-wire arrangement 45/47, as compared with the secondary feedback device 17, resides in the type of design which can be easily constructed, is compact, and is mechanically stable, wherein electronic stabilizing measures are dispensed with whereby a significantly simpler operation and considerably more favorable manufacturing costs are obtained.

In place of the infrared dye $C_{44}H_{30}S_2ClF_7O_2$, dissolved in $\alpha$-hydroxytoluene, it is also possible to utilize other dyes and other solvents; also, color-center crystals can be employed. Instead of using dye lasers, it is also possible to utilize other lasers, such as solid-state lasers and diode lasers, as well as lasers wherein the active medium is constituted by doped waveguides.

Instead of employing the reduction in the high-frequency energy noise components in the laser output pulse for the generation of short, stable pulses, the process of this invention and the laser structure of this invention can also be utilized, in a continuous laser, for lowering its high-frequency energy noise components in the output radiation.

We claim:

1. The process for reducing high-frequency energy noise in an output laser radiation of a laser resonator (1) having resonator mirrors (3, 5, 35, 45), comprising
   oscillating the radiation of said laser resonator within the radiation mode volume and forming first radiation feedback inside said laser resonator (1) by said resonator mirrors (3, 5, 35, 45),
   providing a secondary feedback means (17) having an optical secondary feedback path containing no optically nonlinearly acting components,
   forming in said secondary feedback means (17) from said output laser radiation a second radiation feedback which is a fraction of said output laser radiation, feeding back said fraction second radiation feedback into said radiation mode volume in addition to said first radiation feedback, and adjusting said fraction second radiation feedback to a value of between $10^{-6}$ and $10^{-10}$ of the intensity of said radiation inside said laser resonator (1), which lies in the range of magnitude of 0.5 to 50,000 times the intensity of the spontaneous radiation emission of said laser resonator.

2. The process for reducing high-frequency energy noises in an output laser radiation according to claim 1, including coupling out of said resonator (1) a part of said oscillating radiation inside said radiation mode volume with one (5) of said resonator mirrors (3, 5) to said secondary feedback means, said feeding back step including coupling said fraction second radiation feedback into said radiation mode volume by said one resonator mirror (5).

3. The process for reducing high-frequency energy noises in an output laser radiation according to claim 1, in which second secondary feedback means for forming and feeding back said fraction second radiation feedback into said radiation mode volume is inside said radiation mode volume.

4. The process for the generation of short laser pulses, especially with pulse widths in pico- and sub-picosecond ranges, by a mode-coupled laser, according to claim 1, including time delaying said feeding back of said fraction second radiation feedback of each laser pulse via said optical secondary feedback path, and choosing the time delay of said delaying step to be nearly but not equal to the time or multiple time intervals for a laser pulse travelling through said whole laser resonator (1).

5. The process according to claim 4, wherein said time delay is less than the time intervals for a laser pulse travelling in said laser resonator or less than multiples of said time interval.

6. The process as set forth in claim 4, including choosing the length of said optical secondary feedback path so that photon bunches traversing said optical secondary feedback path are introduced into the oscillating laser pulses in said laser resonator (1, 49).

7. The process as set forth in claim 6, in which said laser resonator (1) has an optical primary path between said resonator mirrors (3, 5, 35, 45), and including adjusting the length of said optical secondary feedback path within the range (29) of ±0.5 mm with respect to the optical length of said optical primary path for optimizing the laser pulses.

8. A laser for emitting an output radiation with reduced high-frequency energy noise, comprising a laser resonator (1) with an active medium (9) and a mode volume, a pumping device (15) for pumping said active medium (9), two resonator mirrors (3, 5) in said laser resonator defining the mode volume of the oscillating laser radiation created by said active medium (9) inside said laser resonator (1), secondary feedback means (17), including a secondary feedback path, connected to receive said output laser radiation from said laser resonator and produce a radiation feedback which is a fraction of said output laser radiation, said secondary feedback means (17) being connected to feed back to said mode volume said fraction radiation feedback, said secondary feedback path containing no optically nonlinearly acting components, and said fraction radiation feedback having an intensity between $10^{-6}$ and $10^{-10}$ of the intensity of said laser radiation inside said resonator (1), and having a magnitude range of 0.5 to 50,000 times the intensity of the spontaneous output radiation of said laser resonator.

9. A laser for emitting an output radiation with reduced high-frequency energy noise according to claim 8, wherein said secondary feedback means (17) is connected outside said laser resonator (1), and said secondary feedback path connected to feed back said fraction radiation feedback into said mode volume through one (5) of said two resonator mirrors (3, 5).

10. A laser for emitting an output radiation with reduced high-frequency energy noise according to claim 8, in which said secondary feedback means includes coupling means (41, 49) for producing said fraction radiation feedback, said coupling means being situated inside said mode volume, and said secondary feedback means (41, 43; 47) being connected inside said laser resonator.

11. A laser for emitting an output radiation with reduced high-frequency energy noise according to claim 8, for the generation of short laser pulses, especially of laser pulses with pulse widths in pico- and sub-picosecond ranges, including means to adjust the optical path length of said secondary feedback path to a length nearly equal to, but not exactly equal to double the optical path length of said laser resonator (1) or multiple.

12. A laser for emitting an output radiation with reduced high-frequency energy noise according to claim 11, in which said pumping device (15) is connected to pump said active medium (9) with laser pulses with a repetition rate equal to the travelling time of laser pulses inside said laser resonator (1).

13. A laser for emitting an output radiation with reduced high-frequency energy noise according to claim 8, including a frequency selective element (11), comprising an etalon, connected within said laser resonator (1).

14. A laser for emitting an output radiation with reduced high-frequency energy noise according to claim 9, including attenuation means (20) connected in said secondary feedback path.

15. A laser for emitting an output radiation with reduced high-frequency energy noise according to claim 8, in which said secondary feedback means (33; 45, 47) and one resonator mirror (35, 45) of said two resonator mirrors (3, 35, 45) are constructed as one unit.

16. A laser for emitting an output radiation with reduced high-frequency energy noise according to claim 15, in which said secondary feedback means (45, 47) includes a secondary reflector (47) adjustably connected adjacent said one resonator mirror (45), said one resonator mirror (45) having a degree of reflection, said secondary reflector (47) offset laterally (b) from the point of impingement of said laser radiation pulses thereon, and the amount of said lateral offset (b) and said degree of reflection of said resonator mirror (45) being chosen so that in the lateral zone of said oscillating laser radiation in said mode volume impinging on said one resonator mirror (45) said fraction radiation feedback having an intensity of 0.5 to 50,000 times the intensity of the spontaneous output radiation of said laser resonator is reflected back into said mode volume.

17. A laser for emitting an output radiation with reduced high-frequency energy noise according to claim 15, in which said secondary feedback means comprises a split cube (33) having a separating surface (41) forming a pair of split cube portions (33a, 33b), and a laser pulse radiation inlet surface (37) which does not retransmit any of said laser pulse radiation back into said mode volume, said separating surface (41) having a degree of transmission, said split cube having at least first and second partially coated outer surfaces (43, 39) positioned relative to said separating surface (41), whereby a portion of said laser pulse radiation impinging on said inlet surface (37) and into said cube (33) is guided to said first coated outer surface (43) and from there is fed back in part via said separating surface (41) into said mode volume, and another portion of said laser pulse radiation impinging on said inlet surface (37) and into said cube (33) is reflected by said separating surface (41) onto said second coated outer surface (39) and from there is fed back in part via said separating surface (41) into said mode volume, said degree of transmission of said separating surface (41) and the degree of reflection of said first partially coated outer surface (43) being such that only radiation having intensity in the range of 0.5 to 50,000 times the intensity of the spontaneous output radiation of said laser resonator is fed back into said mode volume, and the degree of reflection of said second partially coated outer surface (39) being such that said second partially coated outer surface (39) comprises said one resonator mirror (35).

18. A laser for emitting an output radiation with reduced high-frequency energy noise according to claim 17, in which said pair of split cube portions (33a, 33b) are displaceable along said separating surface (41), said cube portion (33a) having said second coated outer surface (39) being fixed in position in said laser resonator (1), and said cube portion (33b) having said first coated outer surface (43) being displaceable relative to said cube portion (33a) having said second coated outer surface (39) whereby the optical distance is variable between said first coated outer surface (43) and the outer resonator mirror (3) of said two resonator mirrors (3, 35).

19. A laser for emitting an output radiation with reduced high-frequency energy noise according to claim 17, in which said first coated outer surface (43) of said split cube (33) is diffusely reflective.

* * * * *